Patented Dec. 22, 1936

2,065,400

UNITED STATES PATENT OFFICE 2,065,400

CHLORINATION OF METHYL ETHER AND THE PRODUCTS OBTAINED THEREFROM

Paul L. Salzberg and James H. Werntz, Wilmington, Del., assignors to E. I. du Pont de Nemours & Company, Wilmington, Del., a corporation of Delaware No Drawing. Application May 4, 1933, Serial No. 669,364

8 Claims. (Cl. 260—151)

This invention relates to an improved process for the halogenation of the lower alkyl ethers and more particularly to an improved process for the preparation of the chlor-methyl ethers from methyl ether and chlorine and new compositions of matter obtained by the chlorination.

Considerable difficulty has been experienced in the chlorination of ethers due to the velocity of the substitution. In direct sunlight, for example, methyl ether and chlorine combine with explosive violence. Various experimenters have endeavored to slow down the reaction in order that the type of products obtained from the halogenation might be more readily controlled. Regnault Ann. 34, 29 (1840) and Friedel, Compt. Rend. 84, 247 (1877) chlorinated methyl ether in diffused sunlight to form monochlormethyl ether and dichlormethyl ether. Wildman and Gray J. A. C. S. 41, 1122 (1919) describe the direct chlorination of ethyl ether. Litterscheid, Ann. 330, 112 (1903–04) chlorinated monochlormethyl ether in diffused sunlight to yield exclusively dichlormethyl ether, while Kleber, Ann. 246, 97–111 (1888) used a mixture of methyl ether, carbon dioxide, and chlorine to form the monochlor methyl ether into which a continuous stream of methyl ether and chlorine was then led and the monochlormethyl ether was thereby formed in itself as a solvent.

An object of the present invention is to provide a new and improved process for the preparation of the halogenated methyl ether from methyl ether and chlorine. Another object of the invention is to provide a process for the preparation of halogenated methyl ether by introducing a gaseous mixture containing methyl ether and chlorine into an inert solvent, the chlorine being present in excess. A still further object of the invention is to provide a process for the preparation of dichlormethyl ether by introducing a gaseous mixture containing methyl ether and chlorine, the chlorine being introduced in excess, into an inert solvent. A still further object of the invention is to provide a process for the preparation of dichlormethyl ether which comprises passing a gaseous mixture containing methyl ether and chlorine, the chlorine being present in excess, into an inert solvent, until the desired quantity of product from the methyl ether and chlorine has been produced, then shutting off the supply of methyl ether and continuing the introduction of chlorine until all of the monochlormethyl ether first formed by the interaction of the methyl ether and chlorine be converted to dichlormethyl ether. Other objects and advantages will hereinafter appear.

We have found that the preparation of halogenated methyl ethers by the interaction of methyl ether with chlorine may be improved by introducing these reactants as vapors into an inert solvent, i. e. a solvent which is either unattacked by the halogen used or which, if it be a halogenated ether, is halogenated to the product desired, the chlorine being introduced into the solvent in excess. We have found that by so conducting the reaction the products obtained consist primarily of the dichlormethyl ether. We have further found that a product may be prepared containing substantially all dichlormethyl ether with but a small amount of halogenated ethers of a higher order and substantially no monochlormethyl ether if the substitution be carried out in the following manner: after preparing the initial halogenated methyl ether by introducing the gaseous mixture containing methyl ether and chlorine into an inert solvent as described, the methyl ether supply is cut off and only chlorine introduced into the chlorinated product. By this procedure it has been found that substantially all the monochlormethyl ether produced by the interaction of the methyl ether with chlorine is converted to the dichlormethyl ether, thereby giving a product containing substantially none of the monochlor and an exceptionally high amount of the dichlormethyl ether.

The reaction may be carried on at temperatures varying from 17° or lower to the boiling point of the solvent at the pressure used, i. e. approximately 60° C., when monochlormethyl ether is used at atmospheric pressure or 106° C. when dichlormethyl ether is used as a solvent at atmospheric pressure. At 17° C. the reaction is slow, while at 60° C. the reaction proceeds with rapidity. Atmospheric pressure may be employed or higher pressures with correspondingly higher temperatures, the pressure being limited apparently only by the strength of equipment in which the reaction is conducted. When the reaction is carried out in the vapor phase the temperature may be as high as the reactants and products will permit without decomposition, for example a temperature of 400–500° C. may be used.

The ratio of chlorine to methyl ether introduced into the inert solvent may vary within considerable limits, although we have found that in order to obtain the desired product in suitable quantity, the ratio of the chlorine to the ether must be controlled within proper limits. For example, with a ratio of chlorine to methyl ether of 6:1, 54% of the methyl ether has been converted to dichlormethyl ether, and 11% to monochlormethyl ether; while with a ratio of 1.8:1, 6% only of the methyl ether was converted to dichlormethyl ether, and 22% to monochlormethyl ether. By increasing the ratio to 6 of methyl ether to 1 of chlorine a product may be obtained containing a high yield of the monochlormethyl ether over the dichlormethyl ether.

The solvents to be used in our process are preferably inert, such, for example, as carbon tetrachloride, chloroform, or solvents resulting from the chlorination of the ether such, for example, as the monochlormethyl ether, dichlormethyl ether, or the higher chlorinated methyl ethers. Likewise mixtures of the various halogenated methyl ethers with carbon tetrachloride and like inert solvents, which do not form undesirable decomposition products with chlorine, may be employed with good advantage.

The chlorination of methyl ether is favorably influenced by actinic light. Light from a mercury-in-glass lamp gave higher conversions than a 60 watt glass enclosed tungsten filament lamp. Catalysts may likewise be employed to accelerate the reaction in the presence or absence of actinic rays, such, for example, as ferric chloride, aluminum chloride, iodine, and sulfur chloride. The chlorides of the following metals may likewise be used with advantage: antimony, tin, gold, vanadium, uranium, zinc, thallium, molybdenum, boron, and copper.

We will now give several examples illustrating methods of carrying out our improved process for the preparation of the halogenated methyl ethers, but it will be understood that the invention will not be limited thereby.

*Example 1.*—402.5 parts by weight of monochlormethyl ether are placed in a suitable glass reaction vessel, equipped with two gas inlet tubes, an efficient agitator, and a reflux condenser cooled with ice water is affixed thereto. The monochlormethyl ether is heated to a temperature of in the neighborhood of approximately 45° C. whereupon methyl ether at the rate of 34.5 parts by weight per hour and chlorine at the rate of 319.5 parts by weight per hour are admitted. The reaction flask is illustrated with controlled light from an electric lamp. During the introduction of the methyl ether and chlorine the temperature is maintained within the range of approximately 45-55° C. After 7¾ hours 838 parts by weight of light yellow liquid is discharged and fractionated to yield 454 parts by weight of monochlormethyl ether and 363 parts by weight of dichlormethyl ether. These results indicate an 11% conversion of methyl ether to monochlormethyl ether and a 54% conversion of methyl ether to dichlormethyl ether.

*Example 2.*—Methyl ether and chlorine were bubbled into carbon tetrachloride contained in a glass reaction vessel illuminated with a 60-watt electric light bulb. The reaction was exothermic and by maintaining an excess of methyl ether the chlorine was completely consumed as evidenced by the absence of color. After processing 5 hours and maintaining a temperature of from 20 to 40° C., the reaction mixture was distilled. A quantity of chlorinated ethers representing a mixture of dichlormethyl ether and more highly chlorinated ethers was isolated.

*Example 3.*—161 parts by weight of monochlormethyl ether was placed in a reaction vessel as described in Example 1. The reaction vessel was warmed to approximately 35° C. and methyl ether introduced at a rate of 6.9 parts by weight per hour and chlorine at a rate of 21.3 parts by weight per hour. The temperature was maintained at approximately 35-40° C. during the introduction of the gases. After five hours 196 parts by weight of a light yellow liquid was discharged and fractionated to yield 16 parts by weight of dichlormethyl ether; this corresponds to a 19% conversion of methyl ether to dichlormethyl ether.

*Example 4.*—Example 3 was repeated after the addition of 5 parts by weight of sulfur monochloride to the monochlormethyl ether used as the solvent. After 5 hours 205 parts by weight of yellow product was isolated and fractionated to yield 2 parts by weight of monochlormethyl ether and 26 parts by weight of dichlormethyl ether.

While the above processes are described as of the single batch type, they may be rendered semi-continuous by a periodic removal of a portion of the reaction mixture and the introduction of additional quantities of the inert solvent. Furthermore, the unreacted gases evolved by the solvent may be separated from the hydrogen chloride and passed into the same or a second converter.

When methyl ether is chlorinated under the conditions disclosed in this invention a mixture of symmetrical dichlormethyl ether,

and unsymmetrical dichlormethyl ether,

is formed. The former boils at 100-102° C. while the latter boils at 82-84° C. On alkaline hydrolysis the symmetrical compound yields two moles of acid, while the unsymmetrical compound yields three moles of acid. The unsymmetrical compound condenses with the olefines in the same manner as the symmetrical compound.

From a consideration of the above specification it will be realized that any process for the chlorination of monochlormethyl ether conducted in accord with this invention or in an equivalent manner will come within the scope thereof without sacrificing any of its advantages.

We claim:

1. In an improved process of making dichlormethyl ether the step which comprises introducing a gaseous mixture containing methyl ether and chlorine, the chlorine being in excess, into an inert solvent, containing a halogenating catalyst.

2. In an improved process of making dichlormethyl ether the step which comprises introducing a gaseous mixture containing methyl ether and chlorine, in the ratio of methyl ether to chlorine of approximately 1 part of methyl ether to 6 parts of chlorine, into an inert solvent.

3. In an improved process of making dichlormethyl ether from a gaseous mixture containing methyl ether and chlorine the steps which comprise introducing the gaseous mixture in which the chlorine is in excess into monochlormethyl ether.

4. In an improved process of making dichlormethyl ether from a gaseous mixture containing methyl ether and chlorine the steps which comprise introducing the gaseous mixture into an inert solvent to produce monochlormethyl ether and subsequently stopping the introduction of methyl ether and continuing the introduction of chlorine until the product is substantially all dichlormethyl ether.

5. In an improved process of making halogenated methyl ether the step which comprises effecting the reaction between methyl ether and chlorine in an inert solvent and in the presence of a halogenating catalyst selected from the group of catalysts consisting of ferric chloride, iodine, sulfur chloride, a chloride of antimony, tin, gold, vanadium, uranium, zinc, thallium, molybdenum, boron, and copper.

6. Unsymmetrical dichlormethyl ether.

7. Unsymmetrical dichlor-dimethyl ether conforming to the structural formula: $CH_3OCHCl_2$, which compound boils at atmospheric pressure at from 82–84° C.

8. In an improved process of making dichlor dimethyl ether the step which comprises introducing a gaseous mixture containing methyl ether and chlorine, the chlorine being in excess, into an inert solvent, to produce monochlor methyl ether and subsequently stopping the introduction of methyl ether and continuing the introduction of chlorine until the product is substantially all dichlor dimethyl ether.

PAUL L. SALZBERG.
JAMES H. WERNTZ.

CERTIFICATE OF CORRECTION.

Patent No. 2,065,400.  December 22, 1936.

PAUL L. SALZBERG, ET AL.

It is hereby certified that error appears in the printed specification of the above numbered patent requiring correction as follows: Page 2, first column, line 48, for the word "illustrated" read illuminated; and that the said Letters Patent should be read with this correction therein that the same may conform to the record of the case in the Patent Office.

Signed and sealed this 2nd day of March, A. D. 1937.

(Seal)

Henry Van Arsdale
Acting Commissioner of Patents.